US011213996B1

(12) United States Patent
Adams et al.

(10) Patent No.: US 11,213,996 B1
(45) Date of Patent: Jan. 4, 2022

(54) IN-LINE COATING METHOD FOR PREPARING SOFT-FEEL POLYMERIC FILMS AND FILMS PREPARED THEREBY

(71) Applicant: Toray Plastics (America), Inc., North Kingstown, RI (US)

(72) Inventors: Bonnie Adams, Charlestown, RI (US); Tracy Paolilli, East Greenwich, RI (US)

(73) Assignee: Toray (Plastics) America, Inc., North Kingstown, RI (US)

( * ) Notice: Subject to any disclaimer, the term of this patent is extended or adjusted under 35 U.S.C. 154(b) by 58 days.

(21) Appl. No.: 16/432,036

(22) Filed: Jun. 5, 2019

Related U.S. Application Data

(60) Provisional application No. 62/724,065, filed on Aug. 29, 2018.

(51) Int. Cl.
| | | |
|---|---|---|
| *B05D 3/00* | (2006.01) | |
| *B05D 3/12* | (2006.01) | |
| *B29C 55/02* | (2006.01) | |
| *B29C 55/14* | (2006.01) | |
| *C08L 23/12* | (2006.01) | |
| *C08L 23/14* | (2006.01) | |
| *C09D 133/00* | (2006.01) | |
| *C09D 175/04* | (2006.01) | |

(52) U.S. Cl.
CPC .............. *B29C 55/14* (2013.01); *B05D 3/002* (2013.01); *B05D 3/007* (2013.01); *B05D 3/12* (2013.01); *B29C 55/026* (2013.01); *C08L 23/12* (2013.01); *C08L 23/14* (2013.01); *C09D 133/00* (2013.01); *C09D 175/04* (2013.01); *B05D 2252/02* (2013.01); *C08L 2203/16* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 3,819,773 A | * | 6/1974 | Pears ....................... | C08J 7/042 264/37.1 |
| 6,217,687 B1 | | 4/2001 | Shibata | |
| 6,254,937 B1 | * | 7/2001 | Schafheutle ....... | C08G 18/0823 427/388.2 |
| 6,761,958 B2 | | 7/2004 | Fitch | |
| 7,214,339 B2 | | 5/2007 | Tsunekawa | |
| 7,378,155 B2 | * | 5/2008 | Gillie ..................... | C08J 7/0427 428/424.8 |
| 8,932,726 B2 | | 1/2015 | Paolilli | |
| 8,986,827 B2 | | 3/2015 | Paolilli | |
| 9,227,381 B2 | | 1/2016 | Paolilli | |
| 9,399,318 B2 | | 9/2016 | Paolilli | |
| 9,598,596 B2 | * | 3/2017 | Munzmay .......... | C08G 18/0866 |
| 9,878,523 B2 | | 1/2018 | Uto | |
| 9,920,206 B2 | * | 3/2018 | Benson ................... | C09D 7/42 |
| 10,040,919 B2 | | 8/2018 | Fitch | |
| 2011/0097524 A1 | * | 4/2011 | Bashir ...................... | D01F 6/62 428/35.5 |
| 2016/0368252 A1 | * | 12/2016 | Sargeant ................ | B29C 55/12 |
| 2017/0081488 A1 | * | 3/2017 | Eveson .................. | C08J 7/046 |
| 2017/0129231 A1 | * | 5/2017 | Tomizawa ............. | B29C 55/14 |

FOREIGN PATENT DOCUMENTS

EP 1606112 B1 11/2012

OTHER PUBLICATIONS

Pergopak® M4. Huber Engineered Materials (2016). Found online at https://www.hubermaterials.com/userfiles/files/product-finder/spec/Pergopak%20M4%20Matting%20and%20Effect%20Agent%20Technical%20Data%20Sheet.pdf (Year: 2016).*

* cited by examiner

*Primary Examiner* — Jose I Hernandez-Kenney
(74) *Attorney, Agent, or Firm* — Rogowski Law LLC

(57) ABSTRACT

An in-line method to make a polymeric film with soft-feel haptic property includes the continuous, sequential steps of: (a) forming a polymer core layer of one or more polyesters; (b) optionally adding an adhesive layer and/or a skin layer over the polymer core layer to make a base layer; (c) stretching the base layer uniaxially in the machine direction; (d) coating the base layer with a liquid solution of a carbodiimide or polycarbodiimide crosslinker and a coating that includes aliphatic water-borne polyurethanes and one or more additives to enhance haptic properties, including urea-formaldehyde beads, aqueous wax dispersions and hollow sphere polymeric pigment dispersion; (e) heating the coated base layer to dry and crosslink the coating solution to form a coating layer on the base layer to create a coated film; (f) stretching the composite coated film in the transverse direction during or immediately following the drying and crosslinking step, and (g) optionally heat-treating the composite coated film to anneal the composite coated film.

16 Claims, 2 Drawing Sheets

IN-LINE COATING METHOD FOR PREPARING SOFT-FEEL POLYMERIC FILMS AND FILMS PREPARED THEREBY

FIELD OF THE INVENTION

An in-line method for preparing polymeric films first stretches a polymer base layer in the machine direction, and then applies a soft-feel coating solution comprising a polyurethane or a polyurethane and an acrylic with a crosslinker onto the base polymer layer before heating and stretching the coated base layer in the transverse direction to dry and cross-link the coating so as to create a soft-feel polymeric film with the advantage of reduced coat weight, excellent adhesion and soft feel.

BACKGROUND OF THE INVENTION

Biaxially oriented polyester (BOPET) and biaxially oriented polypropylene (BOPP) films are popular films used for food and product packaging, decorative and solar window applications, and often perform multiple functions. These films sometimes provide an aesthetically pleasing and enhanced haptic property (such as soft feel), and sometimes provide a heat sealable or printable skin layer. While BOPET and BOPP films are the primary embodiments of this invention, other polymeric substrates may also be contemplated, such as and not limited to: polystyrene films, nylon films, polyethylene films.

The food packaging industry commonly uses BOPET in many heat sealable applications to take advantage of the intrinsic properties of BOPET such as clarity and tensile strength. Typically, a heat sealable polymer layer will melt at an elevated temperature, e.g., between 375° F. to 425° F., thereby forming a bond with another substrate when pressed together with heat and pressure.

BOPET and BOPP films may be coated with other polymeric or acrylic coatings to enhance the surface properties. Coatings may be applied to polymeric films in an "in-line" method or an "off-line" method. In the "off-line" method, a base layer film is formed completely, and then a liquid coating solution layer is applied to the completed base layer. When called for, optional skin and/or adhesive layers are added to a core layer via coextrusion or coating processes well known in the art to complete the base layer formation in the first stage of the off-line method.

In an off-line method, a liquid coating solution layer can be applied to a uniaxially stretched base layer, but typically the base layer is biaxially stretched or oriented before such solution is applied. Commonly, although not necessarily, the steps of base layer film-forming and liquid coating solution layer are performed discontinuously from each other. That is, the base layer film can be produced, stretched and held in storage for coating at a subsequent time and usually at a different location.

The complexity of the off-line method is the added time needed to apply the coating and to dry the coated film. After applying the soft-feel coating solution, volatile components are removed in a static oven at drying temperatures such that the coating is fully dried and crosslinked and the base layer experiences minimal thermal shrinkage. Care is recommended because the static film can be overheated in the oven causing damage to the composite film, such as undesirable deformation of wrinkling, shrinkage and the like. To avoid such results, drying temperature in the static oven of the off-line method should be kept relatively low. For example, temperatures as low as about 75-80° C. might be suitable for drying. A potential problem of drying at too low a temperature is that the heat energy transmitted to the film is not sufficient to fully activate the cross-linking to form strong bonds to the film substrate. Thus, to make a composite soft feel film with effective bonding with an off-line method, attention must be given to balancing temperature and residence time conditions in the static oven.

In addition, off-line methods for coating polymeric films tend to apply a greater amount of soft-feel coating solution, resulting in a higher coating weight to achieve the desired haptic feel properties. Such relatively thick coatings increase the cost of the finished product.

In-line methods for coating biaxially oriented polymeric films are described in the prior art, such as U.S. Pat. Nos. 6,217,687 and 7,378,155 and EP Pat. No. 1606112B1. However, the prior methods do not teach application of soft-feel coatings or produce coated films with desired soft-touch/haptic properties.

A need exists therefore for improved methods to coat polymeric films with soft-feel coatings with an economic advantage. Polymeric films having soft-feel coatings that meet FDA food-packaging standards for food contact materials to make food contact articles are particularly desired.

SUMMARY OF THE INVENTION

A particularly preferred embodiment of in-line processing of a soft-feel polyester or polypropylene film includes the continuous, sequential steps of: (a) forming a polymer core layer; (b) optionally adding an adhesive layer and/or a skin layer over the polymer core layer to make a base layer; (c) stretching the core layer or base layer, preferably uniaxially in the machine direction; (d) coating the core layer or base layer with a liquid solution of a soft-feel coating (comprising a polyurethane, an acrylic or a mixture of both a polyurethane and an acrylic, further comprising dulling and/or matting agents) and a crosslinker; (e) heating the coated core layer or base layer effectively to dry and crosslink the soft-feel coating solution to form a soft-feel layer contiguously upon the core layer or base layer to create a coated film; (f) optionally stretching the composite soft-feel coated film in the transverse direction during or immediately following the drying and cross-linking step, and (g) optionally heat-setting the composite soft-feel coated film to anneal the composite soft-feel coated film to minimize thermal shrinkage effects and produce a thermally stable composite film. If an adhesive layer is present as a component of the base layer, the step (d) coating is applied to the surface of the adhesive layer. The heating step (e) may be at a temperature of from about 150° C. to 160° C. where the polymer core layer is polypropylene, or at a temperature of from about 90° C. to 125° C. where the polymer core layer is polyester. The heat-setting step (g) to anneal the composite soft-feel coated film may be at a temperature of from about 175° C. to 215° C.

The soft-feel coating preferably is formed by mixing a combination of aqueous polyurethane, acrylic, wax dispersion, organic matting agents and crosslinker.

In one embodiment, the polymeric core layer film or base layer film is stretched in the machine direction from about 300% to about 600% (i.e., from 3 times to 6 times the original dimension) for BOPP, or from about 300% to about 400% (i.e., from 3 times to 4 times the original dimension) for BOPET. Then, prior to any other stretching (e.g. transverse orientation) of the film, the coating is applied to a surface of the polymeric core layer film or base layer film. After the soft-feel coating is applied, the coated film may be stretched in the transverse direction; while stretching the coated composite film from about 300-1000% (i.e., from 3 times to 10 times the original dimension) for BOPP, or from about 300-480% (i.e., from 3 times to 4.8 times the original dimension) for BOPET in the transverse direction, the coated composite film is heated to orient the base layer polymer and dehydrate any water of solution from the coating composition. Heating during solvent evaporation, substrate layer polymer orientation and/or annealing can also advance crosslinking of the coating, minimize thermal shrinkage and produce a thermally stable composite film.

A polymeric film made by the inventive method may form a food contact material, such as a package for indirect contact with foods.

BRIEF DESCRIPTION OF THE DRAWINGS

The foregoing summary, as well as the following detailed description of the invention, will be better understood when read in conjunction with the appended drawings. For the purposes of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
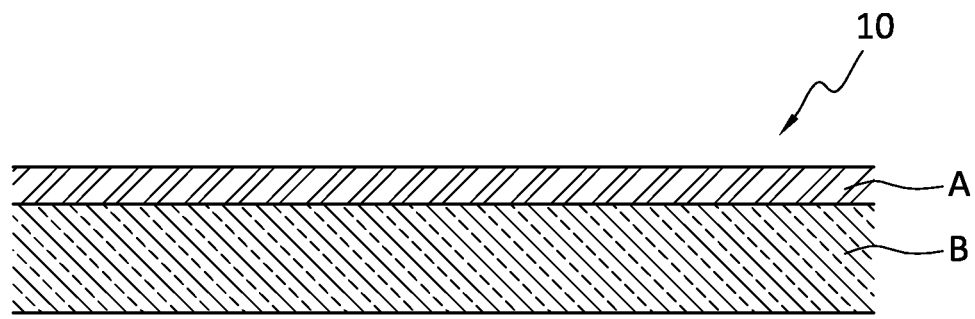
FIG. 1 is a schematic cross-sectional view of a film with a soft-feel coating applied on a polymeric base layer.

As used herein, "comprising" means that other steps and other ingredients which do not affect the end result can be added. This term encompasses the terms "consisting of" and "consisting essentially of". The compositions and methods/processes of the present invention can comprise, consist of, and consist essentially of the essential elements and limitations of the invention described herein, as well as any of the additional or optional ingredients, components, steps, or limitations described herein.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Practice of this invention involves using appropriate materials and processing steps to make a soft-feel coating, and applying the coating to a polymeric core layer or base layer or polymeric substrate to make a multilayer film with low gloss, soft-feel haptic properties and excellent adhesion properties. The multilayer film includes a polymeric substrate film and a soft feel coating layer in contact with one side of the film. The polymeric substrate film preferably first is stretched in the machine direction. The soft-feel layer is cast onto a surface of the polymeric substrate film from a precursor soft-feel layer solution. Primary components of the soft-feel solution are an aliphatic polyurethane, an aqueous acrylic solution, wax dispersion, dulling or matting agents and a crosslinker.

Following application of the solution to the substrate, the wet-coated substrate film is stretched in at least one direction from about 3 to 4.8 times (for BOPET base layer) or about 3 to 10 times (for BOPP base layer) its initial dimension while thermally treating the film. Such stretching preferably is in the transverse direction. Thermal treatment normally includes heating the coated substrate to temperatures and for durations effective to accomplish several results either simultaneously or in rapid succession. These results are (a) removing solvent from the wet coating of the precursor soft-feel layer solution thereby providing a dry, integral and continuous solid soft-feel layer adhered to the surface of the polymeric substrate film, and (b) setting crystalline orientation created in the polymeric substrate film by stretching, and/or annealing the oriented polymeric substrate film to relieve internal stress generated during stretching, and (c) promoting interaction between the soft-feel coating and the substrate to achieve excellent coating adhesion and wet rub properties. Thermal shrinkage is minimized and the resulting soft-feel coated polymeric substrate film is thermally stable.

Polymeric Substrate Film

Polymers suitable for use in this invention as the polymeric substrate or base film include polyesters and polyolefins, including but not limited to: polyethylene terephthalate (PET), polyethylene (PE), polypropylene (PP), nylon (PA, and polystyrene (PS). A preferred polymer for this application is polyethylene terephthalate.

Core Layer

The core layer (B) comprises one or more biaxially stretched film-forming crystallizable polymers, including polypropylenes and polyesters. The polyesters include polyethylene terephthalate (PET), polyethylene naphthalate, polybutylene terephthalate, polycyclohexyldimethylterephthalate (PCT), etc. Typical polyester resins used in the base layer (B) can include, but are not limited to: homopolyesters or copolyesters of polyethylene terephthalate (PET), polyethylene naphthalate (PEN), polyethylene terephthalate-co-isophthalate copolymer (IPET), polyethylene terephthalate-co-naphthalate copolymer, polycyclohexylene terephthalate, polyethylene-co-cyclohexylene terephthalate, polyether-ester block copolymer, ethylene glycol or terephthalic acid-based polyester homopolymers and copolymers, and combinations thereof. In preferable embodiments, the polyester comprises poly(ethylene terephthalate) repeat units. The polyester in the base layer can comprise about 70-99.9 wt %.

The core layer (B) of the coextruded laminate film can also essentially comprise suitable polyolefins such as crystalline propylene homopolymers and/or high crystalline polypropylene homopolymers (HCPP). Examples of suitable homo-polypropylene resins include Total Petrochemical grades 3271 and 3274, Phillipps 66® CH016 and CH020-01. Examples of suitable high crystalline polypropylene resins (HCPP) include Phillips 66® CH020XK, Total Petrochemical 3270 and 3273. Typically, these polypropylene resins have a melt flow rate in the range of from 1.5 to 4.0 g/10 min., a melting point in the range of from 160-167° C., and a density of about 0.90-0.92 g/cm$^3$. Typically, HCPP resins have xylene solubles less than 3%.

As HCPP is used as the core layer resin, preferably, a desirable amount of hydrogenated hydrocarbon resins can be optionally added into the core layer as a processing aid at an amount of from 1.0 to 25 wt % of the core layer, preferably, 2.5 to 10 wt % of the weight. Examples of suitable hydrogenated hydrocarbon resins include Plastolyn® R1140 and Eastotac® H-142W provided by Eastman Chemicals; Oppera® PR100A provided by ExxonMobil. Typically, these hydrocarbon resins are fully hydrogenated water-white amorphous materials having a softening point of from 130 to 150° C.; a glass transition temperature (Tg) in the range of from 75 to 90° C.; a weight-average molecular weight (Mw) in the range of from 500 to 1000 g/mole.

The core layer resin, whether polyester or polypropylene, is typically 5 µm to 50 µm in thickness after biaxial orientation, preferably between 10 µm and 25 µm, and more preferably between 12 µm and 18 µm in thickness.

The term "crystalline polyester" can refer to polyester that has developed at least partial crystallinity during the orientation and heat-setting steps of the film-making process. Without being bound by any theory, crystallinity can involve a regular repeating arrangement of the molecules. To produce a crystal, the polymer chains can be capable of packing closely together in a regular, parallel array. The formation of crystals can require polymer chain mobility. Once a certain degree of crystallinity is attained (which depends on the temperature at which crystallization is taking place) further mobility can be restricted such that a fraction of the polymer remains in a non-crystalline state ("amorphous"). Thus, the term "degree of crystallinity" can reflect the relative amount of crystalline regions and amorphous regions.

Skin Layer

For polypropylene-based core layer, the coextruded outer skin layer (A) which is designed for functionalities could be formulated from polyolefin resins well known in the prior art for the application of heat-sealing, winding, adhesion, or printing. The polyolefin resins include ethylene homopolymer, propylene homopolymer, copolymers and terpolymers of ethylene, propylene and/or butene-1 monomers, or blends thereof. Modified polar polyolefin resins, for instance, maleic anhydride-grafted polar polyolefins or copolymerized polar polyolefin resins could be added into the outer layer A to promote adhesion, particularly as a tie-resin or tie-layer for receiving polar polymer coatings or coextruded layers (e.g. vinyl alcohol or ethylene vinyl alcohol polymers). The antiblock in the outer layer A is preferably selected from particles of synthetic silicates (e.g., Mizusawa Chemical Silton® JC30 grade), synthetic silica $SiO_2$, fully cross-linked silicone polymers, and/or organic anti-blocking polymers such as poly(methyl methacrylate) (PMMA).

Suitable examples of thermoplastic polymers for the outer functional or skin layer (A) include homopolymers of polypropylene and polyethylene resins such as Total Petrochemical 3571 and Dow DOWLEX® 2027G, respectively; mini-random (i.e. comprising a co-monomer other than propylene at less than 1.0 wt %) polypropylene polymer such as Total Petrochemical LX11203; propylene-ethylene copolymers such as Total Petrochemical 8473, ExxonMobil Vistamaxx® 3588FL, and Basell Adsyl® 7416 XCP; copolymers and terpolymers of ethylene, propylene and butene such as Sumitomo WF345J8; and blends thereof.

Optional Skin Layer

Figure 2:
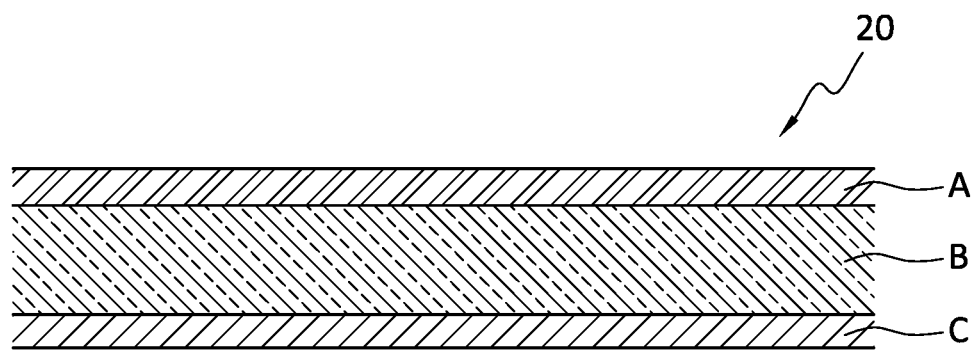
FIG. 2 is a schematic cross-sectional view of a film with a soft-feel coating applied on a polymeric base layer, and with a skin layer applied on an opposite side of the base layer.

For polyester-based core layer, as shown in FIG. 2, in some embodiments, the film 20 may include an amorphous polyester skin layer (C). Skin layer (C) can comprise 60-90 wt. % of one or more of the following: isophthalate modified copolyesters, sebacic acid modified copolyesters, diethyleneglycol modified copolyesters, triethyleneglycol modified copolyesters, and/or cyclohexanedimethanol modified copolyesters. In some embodiments, copolyesters in the amorphous polyester skin layer have a low melting or amorphous aromatic copolyester (such as one based on terephthalate/isophthalate copolymer with ethylene glycol or a copolyester made from a combination of terephthalic acid, ethylene glycol, and cyclohexyldimethanol). The amorphous copolyester may comprise isophthalate modified copolyesters, sebacic acid modified copolyesters, diethyleneglycol modified copolyesters, triethyleneglycol modified copolyesters, cyclohexanedimethanol modified copolyesters, and combinations thereof. In some embodiments, the amorphous polyester skin layer can comprise a copolymer with about 15-20 wt % isophthalate and about 80-85 wt % terephthalate polyester repeat units with ethylene glycol.

The term "amorphous layer" refers to lack of crystallinity development during biaxial stretching, as a result of the copolyesters present having very slow crystallization rate or being not capable of crystallization. The advantage of that feature is heat-sealability to a substrate at temperatures wherein the main or base layer stays intact.

Optionally, other skin layers may be positioned on the side of the main layer (B) opposite the side with the soft-feel coating (A) for improving various performance aspects, such as gas barrier, appearance, hardness, print (ink) adhesion, film adhesion (i.e., with applied adhesives). As one example, a receiving layer suitable for metal deposition, ceramic deposition, in-line or off-line coatings comprising organic gas barrier layers, etc. may be applied as skin layer (C). Such skin layers (C) are preferably coextruded with the main or core layer (B). When the skin layer (C) is present, the combination is referred to as a base layer.

Optional Adhesive Layer

Although not shown in FIGS. 1 and 2, an adhesive layer optionally may be applied to the core layer (B). When the adhesive layer is present, the coating layer (A) is then coated onto the adhesive layer. The adhesive layer may include but is not limited to adhesive materials such as: polyurethanes, polyethylenimines, acrylics and silanes. Such adhesive layers may be applied using in-line or off-line coating processes.

Soft Feel Layer Composition

As shown in FIGS. 1 and 2, a soft-feel coating solution liquid is applied to one side of the core layer (B) with an in-line coater to create layer (A). The film 10 of FIG. 1 has only layers A/B in this embodiment.

Soft-feel carrier coating solutions suitable for applying to base layers include aliphatic water-borne polyurethanes (including Habbco Industries HABBCure® XPD-1368) and aqueous acrylic polymers (including Cork Industries CK-1026SFT). Additional additives that further enhance the haptic properties include but are not limited to urea-methanol polymer powder (including Deuteron GmbH MK), urea formaldehyde beads (including Huber Engineered Materials Pergopak® M3, or Pergopak® M6), aqueous wax dispersions (including Munzing Chemie GmbH Luba-Print® 914A or Luba-Print® WP2120), hollow sphere polymeric pigment dispersion (including Dow Chemical Ropaque® Ultra EF). The soft-feel coating solution is blended, and a suitable crosslinker such as carbodiimide (including Carbodilite® V02L2), melamine, aziridine or isocyanate is added within 48 hours of application to the film substrate.

Processes

Another important aspect of preferred embodiments of this invention is the segment of the process relating to forming the polymeric substrate film, applying the soft-feel layer solution to a surface of the film, and post-application treating the coated film. Post-application treatment includes removing volatile liquid of solution, and optional crosslinking of the polyurethane and acrylic to form a composite of solid soft-feel layer contiguously adhered to the substrate, with stretching and optionally with heat-setting the composite.

Polymeric substrate film formation is accomplished using well known conventional continuous film extrusion unit operation technology. Raw material polymer resin is typically supplied in pellet form. It may be dried to low moisture levels before being heated to melt for extrusion. Equipment used in these operations include well known polymer melt processing extruders with film-forming dies that extrude a molten film onto quenching chill rolls that solidify the film. The film then passes through a sequential series of rolls running at different speeds to stretch the film in a longitudinal, so-called machine direction (MD). The film may be heated in connection with machine direction stretching to obtain preselected morphological effects in the polymer.

In one embodiment of this invention, coating of the polymeric substrate film occurs by an "off-line" method in which film formation is completed and the soft-feel layer precursor solution is applied to the fully formed film. To complete substrate film formation of a uniaxially stretched film, i.e., stretched only in a first technical direction such as the machine direction of a continuously operating film forming unit operation, the film can continue to pass through ovens and tenters to stretch and heat-treat the film in a second technical direction transverse to the machine direction. It is also preferable to ion discharge-treat the coating receiving side of the film prior to coating to ensure adequate wet-out of the coating onto the substrate.

In off-line coating, conventional film coating technology can be used to apply the soft-feel layer solution to a surface of the completed film which may be unoriented, uniaxially oriented or biaxially oriented. A composite soft-feel-coated multilayer film according to this invention having a biaxially oriented polymeric substrate can exhibit low gloss and haptic properties. However, as presently understood, stretching in at least one direction after applying the wet soft-feel coating solution to the substrate film is significant to achieving superior fingernail scratch adhesion and wet rub adhesion performance. Typical solution coating methods that may be used include dip, spray, paint, doctor and meyer rod type techniques, for example. Preferably a reverse gravure application of the coating can be used. The soft-feel coating is dried in a static oven at drying temperatures such that the soft-feel coating is fully dried and crosslinked, and the substrate film experiences minimal thermal shrinkage.

A preferred embodiment of the invention calls for "in-line coating" in which the soft-feel layer is added to the polymeric substrate film by depositing a liquid soft-feel layer solution between the two continuous sequential steps of machine direction (MD) and transverse direction (TD) orientation. That is, the polymeric substrate onto which the wet soft-feel layer solution is applied preferably is stretched in a first technical direction, normally the machine direction, prior to solution application. For example, the polymeric substrate may be stretched in the machine direction from about 300% to about 600% (i.e., from 3 times to 6 times the original dimension) for BOPP, or from about 300% to about 400% (i.e., from 3 times to 4 times the original dimension) for BOPET.

Following application of the soft-feel coating solution, the coated polymeric substrate is stretched in a second technical direction transverse to the first technical direction. For in-line soft-feel layer application, reverse gravure roll techniques are preferred for placing a wet coating of soft-feel layer solution onto the polymer substrate film. The wet coating is preferably substantially completely dried to form a unitary soft-feel layer adhered contiguously to the substrate surface in preheating oven zones prior to transverse direction stretching. Additionally, the soft-feel layer is crosslinked during oven heating by reaction with crosslinking agent added to the soft-feel layer solution. After transverse stretching, the film can be heat-set to minimize shrinkage. The soft-feel layer has been found to successfully extend to about 3-4.5 times its original dimension (i.e., 3×-4.5× or 300% to 450%) when applied to BOPET base films, which is a property suitable for lower extension substrate materials such as polyesters.

In another embodiment, a polypropylene-based substrate can be used instead of a polyester substrate for receiving the soft-feel coating. In such case higher transverse orientation rates can be successfully employed. The soft-feel layer may extend to about 3-10 times its original dimension (i.e., 3×-10× or 300% to 1000%) when applied to BOPP base films, and still maintain the desirable soft-feel haptic qualities and other attributes.

Figure 3:
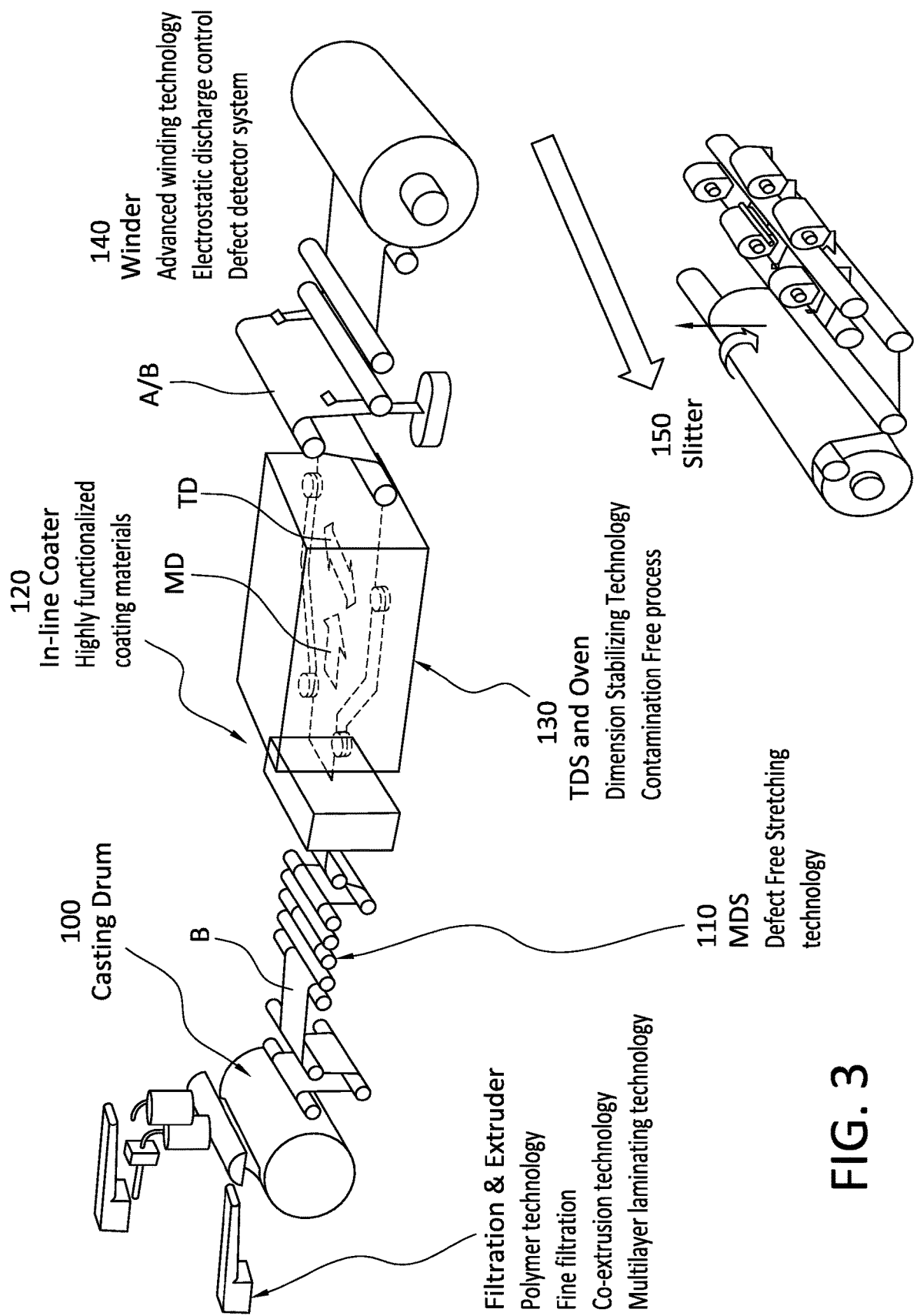
FIG. 3 is a schematic diagram of equipment for an in-line film making process.

Film making equipment suitable for use for "in-line coating" is schematically shown in FIG. 3. The polymeric substrate film or core layer (B) is cast onto casting drum 100 and stretched in the machine direction (MD) in a series of rollers identified as MDS, or defect free stretching. The soft-feel coating is applied to the surface of the core layer (B) in the in-line coater 120. The coated film (NB) then enters the TDS and oven 130 where the coated film (NB) is stretched in the transverse direction (TD), preferably while it is heated. From here, the heat-treated coated film (NB) exits the TDS and oven 130 and is wound on a winder 140 and then cut to desired widths at a slitter 150.

EXAMPLES

This invention is now illustrated by examples of certain representative embodiments.

Analytical methods used in the examples were as follows:

(1) Coat weight (Primer thickness)—Gravimetric method: Film samples are cut in 4×4 inch sheets and weighed on a Mettler analytical balance. The coating is washed off with a solvent, such as isopropyl alcohol, dried, and re-weighed on the balance. The difference in weight times the factor 97 is the weight in gram per square meter (gsm), and then is converted to and recorded in units such as lb. per ream.

(2) Surface Gloss: Surface gloss was measured on the soft-feel coated side of the film at 60° angle according to ASTM D 523 using a Micro TRI-Gloss™ Meter from BYK-Gardner. Three individual measurements along the machine direction of film formation (MD) and three along the transverse direction (TD) were conducted. The overall average of all six measurements is reported. The results are expressed in Gloss Units (GU). The measurement results of a gloss meter are related to the amount of reflected light from a black glass standard of defined refractive index that defines a standard gloss measurement value of 100 gloss units. Material to be measured with a higher refractive index than the standard, such as polymeric film, can have a measurement value above 100 gloss units. Typically, metallic surfaces measure values above 700 gloss units at 60° angle and above about 1500 at 20° angle.

(3) Haze: Haze of the film was measured using a BYK-Gardner Hazegard Plus™ Hazemeter according to ASTM D1003. ASTM D1003 defines haze as that percentage of transmitted light which in passing through the specimen deviates from the incident beam by more than 2.5 degrees on the average. A film with a percent haze value of about 85 or below is preferred.

(4) Coefficient of Friction: The coefficient of friction (symbol: μ) can be either the coefficient of static friction or the coefficient of dynamic friction, based on the formula Ff=μFn, where the coefficient of static friction, μs, is the friction force between two objects when neither of the objects is moving. The coefficient of dynamic friction is the force between two objects when one object is moving, or if two objects are moving against each other. The values of the coefficient of static (μs) and dynamic friction (μd) were measured using a calibrated friction meter Monitor/Slip & Friction Model No. 32-06 made by Testing Machines Inc. (TMI) substantially in conformance to ASTM D 1894. The friction testing was conducted in the "ND/ND" mode, i.e. between the "non-drum side" and "non-drum side". The "non-drum side" is the coated side of the film or opposite the "drum side" where drum refers to the extrusion casting drum (cooling drum). The COF was essentially measured between the coated side of film against the coated side of film. The preferred range for "ND/ND" COF (coefficient of static (μs) and dynamic friction (μd)) in the embodiments is 0.3-1.0.

(5) Softness: Softness Rating Procedure: "Softness" is rated on a scale of 1-4 (1=stiff and hard; 2=moderately stiff; 3=moderately soft; and 4=softest, smoothest) and performed by touching the film's coated surface by hand and subjectively evaluating the perceived softness and/or smoothness of the film.

(6) Adhesion: Finger Nail Scratch Test Procedure: Scratch test is performed subjectively using fingernails to scratch the surface of the dry coated film samples, typically scratching back and forth 5-10 times. The rating of "Good" is given to samples with no coating removed by the fingernail scratching, and "Fair" if any coating is partially removed, and "Poor" if coating is removed entirely by fingernail scratching. The preferred rating is "Good".

(7) Water Resistance (also known as "wet rub" testing: Water Resistance is performed by using a C-fold paper towel, moistened with deionized (DI) water and rubbed by hand with little to no downward force, from 20 to up to 100 times in a back and forth motion. "Pass" is the rating given if no coating is damaged or removed after 100 rubs. "Fail" is the rating given, (number of rubs noted at fail) when the coating is either damaged or is either completely or partially removed when wet rubbed. The preferred rating is "Pass".

Preparation of Polyethylene Terephthalate Film (PET-01 and PET-02)

Two-layer PET coextruded carrier films having a B/C layer structure (PET-02) and single-layer PET films having a B layer structure (PET-01) for the examples were prepared by the following method. PET and ingredients listed in Table 1 below, for each of layers B and/or C, were blended, dried and then extruded in conventional melt extrusion equipment. To produce core layer B a serial set of single screw extruders was used. Extrusion temperatures were in the range of 270° C. to 300° C. The polymer melt flows from each extruder were filtered separately. The polymer melt flow for layer C was coextruded onto one side of the polymer melt flow forming layer B to form an overall B/C base layer structure. The core layer B or the laminate structure of B/C (PET-02) entered a flat die set at about 270° C. The melt curtain exiting the die was cast onto a casting roll and was electrostatically pinned onto a rotating casting roll chilled to about 20° C. causing the curtain to solidify into a continuously moving amorphous sheet. This sheet entered a set of rotating heated rolls of different speeds such that the traveling sheet was oriented about 4 times in the machine direction. Next, a liquid solution of the soft-feel coating formulations set out in Table 1 was mixed together and applied as layer A onto one side of layer B of the sheet using an in-line coater before the sheet was introduced to the tenter oven. If coextruded layer C is used, the side of layer B opposite the side with layer C was coated with layer A before the sheet was introduced to the tenter oven. The machine-direction oriented sheet with soft-feel coating liquid solution applied thereon then traveled into an enclosed heated oven (tenter oven), where the film was first preheated to a temperature of about 80° C. to 90° C. In the next zone, at about 80° C. to 121° C., the moving film was oriented about 4-4.5 times in the transverse direction, and then heat set at about 195° C. to 215° C. The film then was relaxed by about 3% in the relaxation zone of the oven. The resulting two-layer A/B and three-layer A/B/C films were wound up into rolls as is standard industry practice. Optionally, after MD orientation but prior to application of the soft-touch coating solution, the surface of layer B that receives the soft-touch coating may be optionally discharge-treated to enhance wettability ("wet-out") and adhesion of the soft-touch coating. This discharge-treatment may be conducted by any means well-known to the art such as—but not limited to—corona-discharge, flame, or atmospheric plasma treatment methods.

Base Film Layer Components

Film-grade crystalline polyethylene terephthalate (PET) resin: F21MP (IV=0.65; Tm=255° C.) manufactured by Toray Plastics (America), Inc. This resin grade was used for layer B.

PET resin anti-block masterbatch F18M, containing 2 wt % silica particles of average size 2 μm (Fuji Silysia 310P) dispersed in a PET resin matrix, manufactured by Toray Plastics (America), Inc. (IV=0.62; Tm=255° C.). This masterbatch was used as needed in either or both layers B and C.

Slow-crystallizing co-polyester resin "IPET", F55M Resin (IV=0.69; Tm=205° C.) manufactured by Toray Plastics (America), Inc. based on 19:81 molar (=weight % in this case) parts combination of isophthalic/terephthalic acid reacted with ethylene glycol. This resin grade was used for layer C.

Coating Polyethylene Terephthalate Film with Soft-Feel Layer

The exposed surface of the core layer B of the uniaxially oriented film was corona discharge-treated. Liquid solutions of soft-feel layer compositions were continuously coated onto the treated surface of the film's layer B with a gravure roll coating system. After coating the core layer with the soft-feel layer composition, the base layer or coated film was further processed by being fed into a tenter oven at a line speed of about 24 m/min. and pre-heated to 80° C. The soft-feel layer-coated film was stretched in the transverse direction at about 82° C. at a stretching ratio of about 4.5 times the original length and then either heat-set or annealed at about 215° C. as appropriate to reduce internal stress caused by stretch-orientation and to minimize shrinkage, thereby providing a thermally stable biaxially oriented, thermoset soft-feel coated film.

After biaxial stretching, the multi-layer film was wound in roll form for further processing, such as laminating or printing.

Preparation of Soft-Feel Layer Coating Solutions

Liquid aqueous solutions were prepared for coating the skin layer of the polyester films PET-01 and PET-02 according to the above-described procedure.

Composition characteristics and analytical results of physical properties for soft-feel films produced according to the examples are presented in Tables 1 and 2, below.

Comparative Example 1—Commercially available acrylic matte coatings with addition of carbodiimide crosslinker applied in-line to polyester film PET-01. This sample exhibited a desirable low gloss value, but the wet-out performance as well as haze value and substrate adhesion are unacceptable.

Comparative Examples 2 and 3—Comparative Example 1 was repeated except that aliphatic polyurethane solution with added carbodiimide crosslinker, both with (Comp. Ex. 3) and without (Comp. Ex. 2) urea formaldehyde beads, had good adhesion, but did not meet gloss, haze and haptic requirements.

Examples 4-7 repeated Comp. Ex. 1 except that the coating combined the aliphatic polyurethane with acrylic and various dulling agents. Results met gloss, haze and maintained good adhesion property. Haptic property was improved.

Comparative Examples 8-10—PET-01 was coated offline with variations of the aliphatic polyurethane/acrylic blend, both with and without matting agents. Good gloss and haze were achieved, but the coated films failed adhesion testing, demonstrating that orientation of the coated film after application of the coating offers significant advantage.

Example 11—PET-01 was coated with an aliphatic urethane/acrylic blends with urea-formaldehyde beads; an aqueous wax emulsion was also added; this formulation enhanced the soft feel property significantly. This sample achieved the desired results, and is a preferred recipe for the soft-feel coating.

Examples 12 and 13—PET-02 was coated using the same coating composition as in Example 11 and was applied in-line on a commercial production line using two different gravure sizes (22 BCM and 40 BCM, respectively) to achieve different coat weights. Both coated well and tested in the acceptable range of haze, gloss and haptic properties. However, the higher than required coat weight of Example 13 rendered a COF value below the acceptable level. This may indicate an advantage for thinner coating weights for in-line processing.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope of the following claims.

TABLE 1

Soft-Feel Coating Formulations

| Formulation | C1 | C2 | C3 | 4 | 5 | 6 | 7 |
|---|---|---|---|---|---|---|---|
| Film Type | PET-01 | PET-01 | PET-01 | PET-01 | PET-01 | PET-01 | PET-01 |
| Film Gauge | 48 | 48 | 48 | 48 | 48 | 48 | 48 |
| Primer Thickness (#/ream) | 0.60 | 0.60 | 0.60 | 0.60 | 0.60 | 0.60 | 0.60 |
| Coating Mode | In-Line | In-Line | In-Line | In-Line | In-Line | In-Line | In-Line |
| Stretch Ratio (TD/MD) | 4x/3x | 4x/3x | 4x/3x | 4x/3x | 4x/3x | 4x/3x | 4x/3x |
| Aqueous Acrylic Polymer Cork CK-1026SFT | — | — | — | 47.89 pph Solids fraction 0.30 Dry weight 14.37 Dry wt % 44.83 | 48.36 pph Solids fraction 0.30 Dry weight 14.51 Dry wt % 45.53 | 47.44 pph Solids fraction 0.30 Dry Weight 14.23 Dry wt % 42.78 | 47.89 pph Solids fraction 0.30 Dry weight 14.37 Dry wt % 40.18 |
| Aliphatic Waterborne Polyurethane HABBCure™ XPD-1368 | — | 97.60 pph Solids fraction 0.35 Dry weight 34.16 Dry wt % 97.27 | 96.70 pph Solids fraction 0.35 Dry weight 33.85 Dry wt % 94.66 | 47.89 pph Solids fraction 0.35 Dry weight 16.76 Dry wt % 52.30 | 48.36 pph Solids fraction 0.35 Dry weight 16.93 Dry wt % 50.78 | 47.44 pph Solids fraction 0.35 Dry weight 16.60 Dry wt % 49.91 | 47.89 pph Solids fraction 0.35 Dry weight 16.76 Dry wt % 46.88 |
| Urea Formaldehyde Beads Pergopak® M6 | — | — | 0.98 pph Solids fraction 1.00 Dry weight 0.98 Dry wt % 2.74 | — | 0.97 pph Solids fraction 1.00 Dry weight 0.97 Dry wt % 2.91 | 0.95 pph Solids fraction 1.00 Dry weight 0.95 Dry wt % 2.86 | — |
| Wax Dispersion Lubaprint® 914A | — | — | — | — | — | — | — |
| Polycarbodiimide Crosslinker Carbodilite® V02L2 | 2.40 pph Solids fraction 0.40 Dry weight 0.96 Dry wt % 2.96 | 2.40 pph Solids fraction 0.40 Dry weight 0.96 Dry wt % 2.73 | 2.32 pph Solids fraction 0.40 Dry weight 0.93 Dry wt % 2.60 | 2.30 pph Solids fraction 0.40 Dry weight 0.92 Dry wt % 2.87 | 2.32 pph Solids fraction 0.40 Dry weight 0.93 Dry wt % 2.78 | 2.28 pph Solids fractions 0.40 Dry weight 0.91 Dry wt % 2.74 | 2.30 pph Solids fraction 0.40 Dry weight 0.92 Dry wt % 2.57 |
| Styrene Acrylic Latex Ropaque® Ultra EF | — | — | — | — | — | 2 pph Solids fraction 0 Dry weight 0.57 Dry wt % 1.71 | 1 pph Solids fraction 0 Dry weight 0.29 Dry wt % 0.81 |
| Urea-methanol Duraplastic Polymer Deuterion® MK | — | — | — | — | — | — | 1 pph Solids fraction 1 Dry weight 0.96 |

TABLE 1-continued

Soft-Feel Coating Formulations

| Series Acrylic Matte Coating Opulux ® 5002MC | 97.6 pph Solids fraction 0.32 Dry weight 31.52 Dry wt % 97.04 | — | — | — | — | — | Dry wt % 2.69 — |
|---|---|---|---|---|---|---|---|

| | Formulation | C8 | C9 | C10 | 11 | 12 | 13 |
|---|---|---|---|---|---|---|---|
| | Film Type | PET-01 | PET-01 | PET-01 | PET-01 | PET-02 | PET-02 |
| | Film Gauge | 48 | 48 | 48 | 48 | 48 | 48 |
| | Primer Thickness (#/ream) | 0.61 | 0.61 | 0.61 | 0.60 | 0.51 | 1.4 |
| | Coating Mode | Off-line | Off-line | Off-line | In-line | In-line | In-line |
| | Stretch Ratio (TD/MD) | 0x/0x | 0x/0x | 0x/0x | 4x/4.8x | 4x/4.8x | 4x/4.8x |
| Aqueous Acrylic Polymer Cork CK-1026SFT | | 48.36 pph Solids fraction 0.30 Dry weight 14.51 Dry wt % 43.53 | 47.44 pph Solids fraction 0.30 Dry weight 14.23 Dry wt % 42.78 | 47.78 pph Solids fraction 0.30 Dry weight 13.97 Dry wt % 41.68 | 47.78 pph Solids fraction 0.30 Dry weight 13.97 Dry wt % 41.68 | 47.78 pph Solids fraction 0.30 Dry weight 13.97 Dry wt % 41.68 | 47.78 pph Solids fraction 0.30 Dry weight 13.97 Dry wt % 41.68 |
| Aliphatic Waterborne Polyurethane HABBCure ™ XPD-1368 | | 48.36 pph Solids fraction 0.35 Dry weight 16.93 Dry wt % 50.78 | 47.44 pph Solids fraction 0.35 Dry weight 16.60 Dry wt % 49.91 | 47.89 pph Solids fraction 0.35 Dry weight 16.76 Dry wt % 50.34 | 46.55 pph Solids fraction 0.35 Dry weight 16.29 Dry wt % 48.62 | 46.55 pph Solids fraction 0.35 Dry weight 16.29 Dry wt % 48.62 | 46.55 pph Solids fraction 0.35 Dry weight 16.29 Dry wt % 48.62 |
| Urea Formaldehyde Beads Pergopak ® M6 | | 0.97 pph Solids fraction 1.00 Dry weight 0.97 Dry wt % 2.91 | 0.95 pph Solids fraction 1.00 Dry weight 0.95 Dry wt % 2.86 | — | 0.94 pph Solids fraction 1.00 Dry weight 0.94 Dry wt % 2.81 | 0.94 pph Solids fraction 1.00 Dry weight 0.94 Dry wt % 2.81 | 0.94 pph Solids fraction 1.00 Dry weight 0.94 Dry wt % 2.81 |
| Wax Dispersion Lubaprint ® 914A | | — | — | — | 3.72 pph Solids fraction 0.38 Dry weight 1.42 Dry wt % 4.22 | 3.72 pph Solids fraction 0.38 Dry weight 1.42 Dry wt % 4.22 | 3.72 pph Solids fraction 0.38 Dry weight 1.42 Dry wt % 4.22 |
| Polycarbodiimide Crosslinker Carbodilite ® V02L2 | | 2.32 pph Solids fraction 0.40 Dry weight 0.93 Dry Wt % 2.78 | 2.28 pph Solids fraction 0.40 Dry weight 0.91 Dry wt % 2.74 | 2.30 pph Solids fraction 0.40 Dry weight 0.92 Dry wt % 2.76 | 2.24 pph Solids fraction 0.40 Dry weight 0.90 Dry wt % 2.67 | 2.24 pph Solids fraction 0.40 Dry weight 0.90 Dry wt % 2.67 | 2.24 pph Solids fraction 0.40 Dry weight 0.90 Dry wt % 2.67 |
| Styrene Acrylic Latex Ropaque ® Ultra EF | | — | 2 pph Solids fraction 0 Dry weight 0.57 Dry wt % 1.71 | 1 pph Solids fraction 0 Dry weight 0.29 Dry wt % 0.86 | — | — | — |
| Urea-methanol Duraplastic Polymer Deuterion ® MK Series | | — | — | 1 pph Solids fraction 1 Dry weight 0.96 Dry wt % 2.88 | — | — | — |
| Acrylic Matte Coating Opulux ® 5002MC | | — | — | — | — | — | — |

TABLE 2

Summary of Results

| Ex. | Coating Chemistry | Dulling Agent Additives | Other Additives | Crosslinker | Dry Coat Wt. lb./ream | 60° Gloss | % Haze | COF ND/ND µs/µd | Softness Rating (4 = best) | Adhesion Finger Scratch | Wet Adhesion Rub 100X | Stretch Ratio MD/TD |
|---|---|---|---|---|---|---|---|---|---|---|---|---|
| C1 | Acrylic Matte Coating | — | — | Carbodiimide | 0.6 | 3 | 91 | 1.455/0.791 | 1 | Poor | Fail | 3x/4x |
| C2 | Aliph PU | — | — | Carbodiimide | 0.6 | 19 | 50 | 0.4/0.3 | 2 | Good | Pass | 3x/4x |
| C3 | Aliph PU | Urea Formaldehyde Beads | — | Carbodiimide | 0.6 | 22 | 68 | 0.4/0.38 | 2 | Good | Pass | 3x/4x |
| 4 | Aliph PU/Acrylic | — | — | Carbodiimide | 0.6 | 11 | 78 | 0.6/0.4 | 3 | Good | Pass | 3x/4x |

TABLE 2-continued

Summary of Results

| Ex. | Coating Chemistry | Dulling Agent Additives | Other Additives | Crosslinker | Dry Coat Wt. lb./ream | 60° Gloss | % Haze | COF ND/ND μs/μd | Softness Rating (4 = best) | Adhesion Finger Scratch | Wet Adhesion Rub 100X | Stretch Ratio MD/TD |
|---|---|---|---|---|---|---|---|---|---|---|---|---|
| 5 | Aliph PU/Acrylic | Urea Formaldehyde Beads | — | Carbodiimide | 0.6 | 11 | 78 | 0.6/0.4 | 3.5 | Good | Pass | 3x/4x |
| 6 | Aliph PU/Acrylic | Styrene Acrylic Latex and Urea Formaldehyde Beads | — | Carbodiimide | 0.6 | 11 | 75 | 0.586/0.447 | 3 | Good | Pass | 3x/4x |
| 7 | Aliph PU/Acrylic | Styrene Acrylic Latex and Urea-methanol Duroplastic polymer | — | Carbodiimide | 0.6 | 11 | 72 | 0.75/0.75 | 3 | Good | Pass | 3x/4x |
| C8 | Aliph PU/Acrylic | Urea Formaldehyde Beads | — | Carbodiimide | 0.6 | 11 | 81 | 1.395/0.594 | 3 | Fair | Fail | 0x/0x |
| C9 | Aliph PU/Acrylic | Styrene Acrylic Latex and Urea Formaldehyde Beads | — | Carbodiimide | 0.6 | 10 | 80 | 1.214/0.618 | 3 | Poor | Fail | 0x/0x |
| C10 | Aliph PU/Acrylic | Styrene Acrylic Latex and Urea-methanol Duroplastic polymer | — | Carbodiimide | 0.6 | 11 | 80 | 0.686/0.522 | 3 | Poor | Fail | 0x/0x |
| 11 | Aliph PU/Acrylic | Urea Formaldehyde Beads | Aq. Wax Emulsion | Carbodiimide | 0.6 | 11 | 75 | 0.606/0.434 | 4 | Good | Pass | 3x/4x |
| 12 | Aliph PU/Acrylic | Urea Formaldehyde Beads | Aq. Wax Emulsion | Carbodiimide | 0.5 | 15 | 74 | 0.652/0.511 | 4 | Good | Pass | 4.8x/4x |
| 13 | Aliph PU/Acrylic | Urea Formaldehyde Beads | Aq. Wax Emulsion | Carbodiimide | 1.4 | 12 | 85 | 0.355/0.285 | 4 | Good | Pass | 4.8x/4x |

The invention claimed is:

1. A method for preparing a biaxially oriented polyester polymeric film, comprising:
   (a) forming a polymer core layer B of one or more polyesters;
   (b) optionally adding an adhesive layer or a skin layer C onto the polymer core layer to make a base layer B/C;
   (c) stretching the polymer core layer or base layer uniaxially in a machine direction;
   (d) coating a surface of the polymer core layer B, or a surface of the polymer core layer B opposite the skin layer C, with a liquid solution A consisting of (i) a crosslinker, wherein the crosslinker is a material selected from the group consisting of carbodiimides and polycarbodiimides, and (ii) a coating comprising one or more aliphatic water-borne polyurethanes, and one or more aqueous acrylic polymers, and with said coating incorporating one or more additives to enhance haptic properties of the biaxially oriented polyester polymeric film;
   (e) heating the coated polymer core layer B to dry and crosslink the coating and crosslinker of liquid solution A to form an outer coating layer on the layer B to create a coated film; and
   (f) stretching the coated film in the transverse direction during or following the heating step (e) to form the biaxially oriented polyester polymeric film.

2. The method of claim 1, wherein the skin layer C is formed of one or more polyesters.

3. The method of claim 1, wherein heating the coated polymer core layer B of step (e) is at a temperature of from about 90° C. to 125° C.

4. The method of claim 1, wherein stretching in the transverse direction of step (f) is from about 3 to 4.8 times an original width of the coated film.

5. The method of claim 1, further comprising: (g) heat-treating the coated film to anneal the biaxially oriented polyester polymeric film.

6. The method of claim 5, wherein heat-treating the coated film of step (g) is at a temperature in the range of from about 175° C. to 215° C.

7. The method of claim 1, wherein coating the base layer step (d) is indirectly coating the polymer core layer B by applying the liquid solution A onto the adhesive layer.

8. The method of claim 1, wherein the biaxially oriented polyester polymeric film has a percent haze value of about 85 or below.

9. The method of claim 1, wherein the biaxially oriented polyester polymeric film has a gloss value at 60° angle (pre-lamination) of about 20 or below.

10. The method of claim 1, wherein the biaxially oriented polyester polymeric film has a coefficient of friction between the (ND/ND) of about 0.3-1.0 for both μs and μd.

11. The method of claim 1, wherein the biaxially oriented polyester polymeric film resists rub off by a wet adhesion rub test.

12. The method of claim 1, wherein the one or more additives to enhance haptic properties of the biaxially oriented polyester polymeric film is selected from the group consisting of: urea-methanol polymer powders, urea formaldehyde beads, aqueous wax dispersions, and hollow sphere polymeric pigment dispersions.

13. The method of claim 1, wherein the skin layer C is present.

14. The method of claim 1, wherein the adhesive is applied to the core layer B.

15. The method of claim 1, wherein the biaxially oriented polyester polymeric film has a percent haze value of at least 72 and at most 85.

16. The method of claim 1, wherein the coating comprises an aliphatic urethane/acrylic blend with urea-formaldehyde beads and includes an aqueous wax emulsion as the additive to enhance haptic properties of the biaxially oriented polyester polymeric film.

* * * * *